March 31, 1964      B. VAN EMDEN      3,127,548
THREE PHASE CONTROLLER USING SEQUENCE SWITCHING
Filed March 26, 1962

INVENTOR.
BERNARD VAN EMDEN
BY Elliott & Pastoriza
ATTORNEYS.

United States Patent Office 3,127,548
Patented Mar. 31, 1964

3,127,548
THREE PHASE CONTROLLER USING
SEQUENCE SWITCHING
Bernard Van Emden, Van Nuys, Calif., assignor to Automation Development Corporation, a corporation of California
Filed Mar. 26, 1962, Ser. No. 182,211
5 Claims. (Cl. 318—254)

This invention relates generally to electrical control circuits and more particularly to a control circuit for a stepper motor having three phase field windings.

In stepper motors of the type under consideration, there are provided field windings for generating a magnetic field vector. These field windings are so disposed with respect to a rotor that sequential energization of certain ones of the windings will generate a magnetic vector which is effectively caused to "step" through discrete angular distance over 360 degrees. The rotor may comprise a permanent magnet which will align itself with the generated magnetic vector so that the rotor is caused to step through the same discrete angles. Alternatively, the rotor may comprise a high permeability material defining two or more poles. The rotor will then be moved in a manner to align the nearest diametrically opposite poles with the particular field windings being energized. This type of motor is known as a "reluctance motor," the rotor itself moving in a manner to minimize the reluctance of the magnetic circuit passing through the energized field windings.

Conventional stepper motors comprise at least four field windings for generating a magnetic vector which may be sequentially stepped through arcuate distances of 90 degrees to provide a 90 degree type stepper motor in the event a two pole rotor is employed. Of course, by employing more than two poles on the rotor, smaller angular steps will be achieved. In case only two field windings are provided, the generated magnetic vector will rotate through one hundred eighty degrees. As a consequence, there results an ambiguity in that the rotor will not know in which direction to turn to align diametrically opposite poles with the magnetic vector. Thus, the minimum number of field poles or windings to avoid an ambiguity in forward or reverse directions is three. However, the control circuits for sequentially energizing a three phase field winding usually have included as many components as are now used to sequentially energize four field windings.

With the foregoing in mind, it is a primary object of this invention to provide a novel three phase controller for sequentially energizing three terminal circuits sequentially in a forward direction, in response to clockwise pulses, and in a reverse direction, in response to counterclockwise pulses, to the end that a three phase type reluctance motor may be operated with less components than has heretofore been required.

More particularly, it is an object of this invention to provide a novel three phase controller which is more economical and reliable than control circuits heretofore provided in that it employs one less switching element for effecting the desired sequential switching action.

Another object of this invention is to provide a novel combination three phase controller and reluctance motor.

Briefly, these and many other objects and advantages of this invention are attained by providing a three phase control circuit which includes first, second, and third switch means connected respectively to first, second, and third circuit terminals to energize the same upon closing. The control circuit also includes interconnecting means between the switch means which is responsive to closing of any one of the switch means to maintain the other two of the switch means open so that only one of the switch means is closed at any one time. There is thus essentially provided a tri-stable circuit capable of three states of operation wherein operation in any one state automatically excludes the possibility of simultaneous operation in either or both of the other two states.

Cooperating with the foregoing tri-stable circuit is a logic means connected to effect closing of the first, second, and third switch means in a sequential forward direction in response to a series of clockwise pulses and in a sequential reverse direction in response to a series of counterclockwise pulses.

By connecting the circuit terminals which are caused to be sequentially energized to the three phase field windings of a reluctance motor, the desired control of stepping of the motor in forward and reverse directions can be achieved.

A better understanding of the invention will be had by now referring to preferred embodiments thereof as illustrated in the accompanying drawings, in which.

Figures 1, 3:
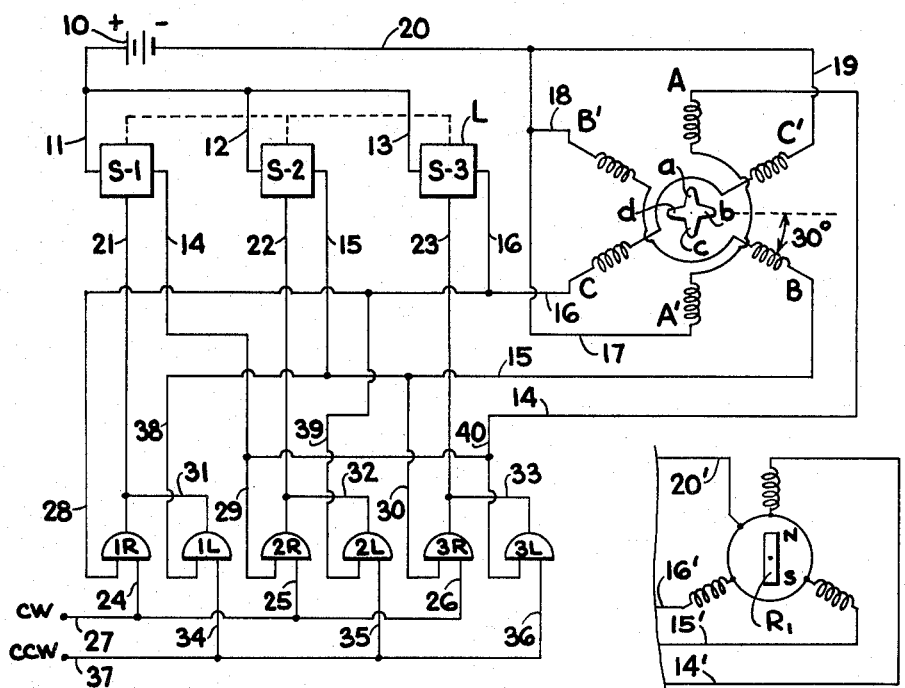
FIGURE 1 is a block diagram of the three phase controller and reluctance motor.
FIGURE 3 shows a permanent magnet motor useable with the controller.

Referring first to FIGURE 1, there is schematically illustrated at the upper lefthand portion of the drawing a D.-C. source in the form of a battery 10 having positive polarity connected through power leads 11, 12, and 13 to one side of first, second, and third switch means shown by the blocks S–1, S–2, and S–3, respectively. The output or opposite sides of the first, second, and third switch means connect through conductors 14, 15, and 16 respectively to terminal circuits which, in the particular embodiment shown for illustrative purposes, connect to first, second, and third field windings for a reluctance motor. These windings are respectively designated A—A', B—B', and C—C', and, as shown, are spaced 120 degrees. The other ends of the windings are respectively connected through conductors 17, 18, and 19 to a common negative lead 20 passing to the other side of the battery 10.

From the foregoing arrangement, it will be immediately evident that sequential closing of the switch means S–1, S–2, and S–3 will sequentially energize the coils A—A', B—B', and C—C' to generate a magnetic field vector which is caused to sequentially rotate through 120 degrees. If a rotor such as R' shown in FIGURE 3 in the form of a permanent magnet having a north and south pole were provided, this rotor would be caused to similarly step through 120 degree arcs, the magnet itself tending to align its field with the generated field vector.

As an alternative to a permanent type rotor, however, there is disclosed in FIGURE 1 a reluctance rotor R formed of high permeable material defining four poles a, b, c, and d spaced at ninety degrees. By using such a four pole rotor, steps of thirty degrees can be sequentially effected by energiaztion of the field windings as described. For example, assuming that field windings A—A' are energized, the rotor R will assume the position shown with the diametrically opposite poles a and c positioned to minimize the reductance path through the coils A and A'. If next the coils B and B' are energized to generate a magnetic field vector 120 degrees in a clockwise direction from the field vector formerly provided by the coils A and A', the rotor R will rotate in a clockwise direction through thirty degrees to align its diametrically opposite poles b and d with the coils B and B' respectively. This is because the poles b and d are respectively closer to the coils B and B' than are any of the other poles. If next the coils C—C' are energized, the rotor R will then step through another thirty degrees to align its diametrically opposite poles c and a with the coils C and C' respectively.

If the coils are energized in a reverse direction, then the rotor R will be caused to step in thirty degree increments in a counterclockwise direction. The number of degrees constituting each step of a reluctance type rotor is equal to 360 degrees divided by the number of poles on the rotor multiplied by the number of coil pairs constituting thet field windings. Thus, for the example of FIGURE 1, there are four poles and three field pairs giving a product of 12, which when divided into 360 degrees, equals 30 so that the rotor will step through 30 degree angles.

Referring again to the control circuit portion of FIGURE 1, there are provided trigger lines 21, 22, and 23 for the three switches S-1, S-2, and S-3, respectively. These trigger lines are arranged to pass a trigger pulse to the switches for closing the switches. Thus, for example, a trigger pulse on the line 21 passed to the switch S-1 will close this switch to connect source 10 through power line 11 to the output lead 14, thereby energizing the coils A—A'. Similarly, if a trigger pulse is received on the lead 22 or the lead 23, switch S-2 or switch S-3 wil be closed to energize coils B—B' or C—C'.

An important feature of this invention constitutes an interconnecting means between the switches S-1 and S-2 and S-3 which will automatically enable only one switch to be closed at any one time. This interconnecting means is indicated schematically by the dashed lines L. If any one switch is triggered to be closed, the other two switches are prevented from closing.

Referring to the lower portion of FIGURE 1, there is provided a logic circuit for sequentially closing the switches S-1, S-2, and S-3 in either a forward or reverse direction in response to clockwise or counterclockwise pulses, respectively. Towards this end, the logic circuit includes clockwise control means comprising first, second, and third "and" circuits designated 1R, 2R, and 3R in FIGURE 1. Each of these "and" circuits has an output and two inputs. The "and" circuit is designed such that a pulse will only be provided on its output when both its inputs are energized simultaneously. As shown, the outputs for the "and" circuits 1R, 2R, and 3R connect directly to the trigger leads 21, 22, and 23, respectively.

One of the inputs for each of the "and" circuits 1R, 2R, and 3R connects through leads 24, 25, and 26 respectively to a clockwise bus 27 for receiving clockwise pulses. The other input to the "and" circuits 1R, 2R, and 3R connect through leads 28, 29, and 30 to the output leads 16, 14, and 15, respectively, each of which output leads is for the switch means immediately preceding the switch means connected to the output of the particular "and" circuit in question.

The logic means also includes a counterclockwise control means comprising first, second, and third "and" circuits 1L, 2L, and 3L. As shown, each of these "and" circuits includes an output and two inputs and has the property of providing a signal on its output only when its inputs are energized simultaneously. The outputs of these latter mentioned "and" circuits connect through leads 31 and 32 and 33, respectively, to the trigger leads 21, 22, and 23 of the switches S-1, S-2, and S-3. One input for each of these "and" circuits connects through leads 34, 35, and 36 to a common bus 37 for passing counterclockwise pulses to the circuits. The other inputs for each of the circuits connect through leads 38, 39, and 40, respectively, to the output lines 15, 16, and 14, respectively. Thus, one input of each of the counterclockwise "and" circuits connects to the output switch line of that switch immediately following the one to which the output of the "and" circuit in question is connected.

The operation of the circuit described in FIGURE 1 will be evident from the foregoing description. Assume, for example, that switch S-1 is closed. Because of the interconnecting means schematically indicated by the letter L, the switches S-2 and S-3 are held open. Thus, power from battery 10 will pass through lead 11, through closed switch S-1, to output lead 14 and thence to coils A—A' in thet reluctance motor and through return leads 17 and 20 to the other side of the battetry 10. The coils A and A' will thus be energized and the rotor R will align two diametrically opposite poles therewith. Assume now that a clockwise pulse is received on the bus line 27. This clockwise pulse will be passed to the "and" circuits 1R, 2R, and 3R thereby energizing the three inputs to these circuits. However, only the other input of the "and" circuit 2R is already energized through the connection from output line 14 and lead 29. Therefore, the clockwise pulse will only affect the "and" circuit 2R and provide an output pulse to the lead 22. This output or trigger pulse will then close the switch S-2 and through the interconnecting mechanism L cause both switches S-1 and S-3 to open. Since S-3 is already open, it will have no effect on S-3 and only S-1 will be caused to open, thereby deenergizing the coils A and A'. Closure of the switch S-2 on the other hand passes power from the battery 10 through lead 12 and output lead 15 to the coils B—B', thereby effectively rotating the generated field vector 120 degrees. The rotor R will then step through 30 degrees to align its opposite poles b and d as described heretofore with these latter energized field windings.

Similarly, the next clockwise pulse will close switch S-3 and cause switch S-2 to open. The sequence S-1, S-2, S-3, S-1, S-2, etc., will continue in response to clockwise pulses received on the bus line 27.

Assume now that when the switch S-1 was closed instead of a clockwise pulse, a counterclockwise pulse was received on the line 37. In this event, the inputs to the "and" circuits 1L, 2L, and 3L would be energized. However, only the other input to the "and" circuit 3L will be energized through the lead 33 from the output line 14. Therefore, an output pulse will pass only from the "and" circuit 3L to the switch S-3 closing the switch and causing switch S-1 to open. Closing of the switch S-3 will energize the coils C—C' through the output lead 16, thereby causing the magnetic vector to rotate in a counterclockwise direction from its original position to align itself with the coils C and C'. The output signal from the switch S-3 is also passed through the lead 39 to the other input of the "and" circuit 2L so that the next counterclockwise pulse received by the "and" circuit 2L will result in an output trigger pulse on the lead 32 to trigger lead 22 to operate switch S-2. When switch S-2 closes, switch S-3 is caused to open so that the coils B—B' are energized. The magnetic vector is then again rotated through 120 degrees in a counterclockwise direction. It is thus evident that as sequential counterclockwise pulses are received, the switches S-1, S-3, S-2, S-1, S-3, S-2, etc. are sequentially energized.

Any number of different types of electronic circuits to carry through the function of the "and" circuits may be used. The only requirement is that a single output trigger be generated only when both inputs are simultaneously energized. From a Boolean algebra standpoint, equivalent results can be achieved by using "or" circuits.

Figure 2:
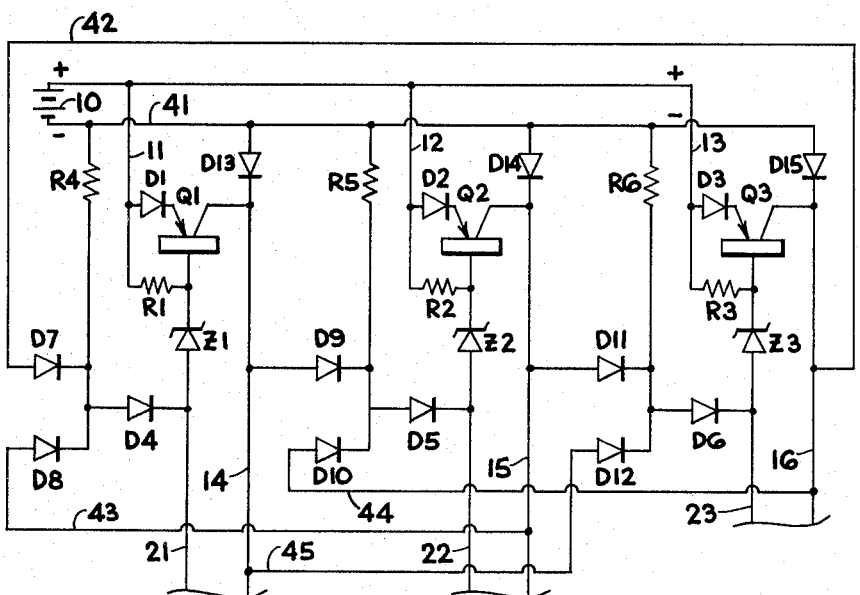
FIGURE 2 is a circuit diagram of a portion of the circuit of FIGURE 1.

Referring now to FIGURE 2, there is shown in detail applicant's preferred embodiment for the switches S-1, S-2, and S-3 shown in the blocks in FIGURE 1. Essentially, the arrangement, together with the interconnecting means, constitutes a tri-stable circuit in that it is capable of three states or conditions corresponding to the first, second, or third switches being closed while the other two are held open.

In FIGURE 2, the switches S-1, S-2, and S-3 themselves take the form of transistors Q1, Q2, and Q3. The base terminals of these transistors connect through zener diodes Z1, Z2, and Z3 respectively to base control leads 21, 22, and 23 corresponding to the trigger leads 21, 22, and 23 illustrated in FIGURE 1. The output lines 14, 15, and 16 shown in FIGURE 1 on the other hand constitute the collector leads from the transistors Q1, Q2, and Q3. Each of the emitter terminals includes a temperature stabilizing diode D1, D2, and D3 connected to a base current resistance R1, R2, and R3.

Each of the bases of the transistors Q1, Q2, and Q3 is supplied with a base current through first current paths. The current path for Q1 passes from the positive side of the battery 10 through lead 11, resistance R1, and zener diode Z1 in a reverse direction, a diode D4 and thence through a resistance R4 to a lead 41 connecting to the other side of the battery 10. Similarly, the current path for the base of transistor Q2 passes from the positive side of battery 10, line 12, R2, zener diode Z2, a diode D5, and a resistance R5 to the return line 41. The current path for Q3 passes through line 13, resistance R3, zener diode Z3, a diode D6 and a resistance R6 to the line 41.

The interconnecting means schematically depicted by the letter L in FIGURE 1 is effected in the circuit of FIGURE 2 by pairs of alternate base current paths. These pairs of alternate current paths connect the base of any one transistor with the collector terminals of the remaining two transistors. For example, the base of transistor Q1 connects through D4 and diodes D7 and D8 respectively to the collector for transistor Q3 through lead 42 and to the collector for transistor Q2 through lead 43. The pair of alternate current paths for the base of the transistor Q2 pass through D5 and diodes D9 and D10 to the collector for the transistor Q1 and the collector for the transistor Q3 respectively, the latter connection being effected through a lead 44. Finally, the pair of alternate current paths for the base of the transistor Q3 connect through D6 and diodes D11 and D12 to the collector for the transistor Q2 and the collector for the transistor Q1 through the lead 45. The collectors for the transistors Q1, Q2, and Q3 are returned to lead 41 and the negative side of the battery 10 through diodes D13, D14, and D15, respectively.

In the operation of the circuit of FIGURE 2, assume that transistor Q1 is conducting. In this event, its collector will be positive as a consequence of current from battery 10 through the lead 11, emitter terminal of the transistor Q1 to the collector terminal placing positive voltage on the line 14. This positive voltage will be communicated through the diode D9 and resistance R5 to hold the back side of D5 positive and thus the base of the transistor Q2 off and also through the diode D12 to hold the base of the transistor Q3 off. Thus, so long as Q1 is conducting, it is not possible for Q2 or Q3 to conduct in the absence of a negative trigger pulse.

If now a negative trigger pulse is applied to the base of either Q2 or Q3, one or the other will commence conducting. Assume that the sequence of switching is for clockwise pulses so that the base of transistor Q2 is triggered by an output pulse from the "and" circuit 2R of FIGURE 1 passed up the line 22. As soon as transistor Q2 commences conducting, its collector will have a positive potential, which positive potential will be communicated through the diode D11 to the base of the transistor Q3 insuring that this transistor is off and also through the lead 43 and diode D8 to the base of the transistor Q1 cutting off transistor Q1. Transistor Q2 then can only conduct and the positive potential on the collector lead 15 will be available for energizing the corresponding field windings as described in FIGURE 1. Since the circuit is symmetrical, the operation of any one of the transistors will hold the other two off.

In the particular electrical diagram set forth, PNP type transistors have been shown. It is possible, although not desirable from an economic standpoint, to employ NPN transistors. In this event, the circuit would be identical except that each of the diodes would be reversed and the battery 10 would be reversed to reverse the polarity.

From the foregoing description, it will be evident that the present invention has provided a unique three phase controller for the reluctance motor disclosed.

FIGURE 3 illustrates a permanent magnet type rotor R' together with field windings spaced at 120 degrees. Input leads corresponding to 14, 15, and 16 and a return lead corresponding to 20 in FIGURE 1 are indicated by the same numerals primed in FIGURE 3. In this embodiment, sequential closing of the switch means will stop the rotor R' through angles of 120 degrees.

Various other modifications falling within the scope and spirit of this invention will occur to those skilled in the art. The invention is therefore not to be thought of as limited to the exact embodiments set forth merely for illustrative purposes.

What is claimed is:

1. A three phase control circuit for sequentially energizing first, second, and third circuit terminals in a forward direction in response to a series of clockwise pulses and in a reverse direction in response to a series of counterclockwise pulses, said control circuit including:
   (a) first, second, and third solid state switch means having input, output, and control terminals respectively;
   (b) a D.-C. source of electrical energy connected to said input terminals, said output terminals connecting respectively to said first, second, and third circuit terminals to energize the same when the corresponding solid state switch means is caused to conduct;
   (c) interconnecting means between said solid state switch means responsive to conduction of any one of said solid state switch means to render the other two of said solid state switch means non-conducting so that only one of said solid state switch means conducts at any one time; and,
   (d) logic means connected to said control terminals of said solid state switch means to pass trigger pulses thereto in a sequential forward direction in response to said series of clockwise pulses and in a sequential reverse direction in response to said series of counterclockwise pulses, any one solid state switch being caused to conduct in response to reception of a trigger pulse passed to its control terminal.

2. A control circuit according to claim 1, in which said first, second, and third solid state switch means comprise first, second, and third transistors, said input, output, and control terminals constituting the emitter, collector, and base terminals respectively of said transistors, and in which said interconnecting means includes first, second, and third pairs of alternate current paths, each pair connecting the base terminal of each transistor to the collector terminals of the remaining two transistors respectively, whereby conduction of any one transistor completes alternate current paths to the bases of the remaining two transistors so that said remaining two transistors are rendered non-conductive so long as said one transistor remains conducting.

3. A control circuit according to claim 1, in which said logic means includes:
   (I) clockwise control means which is:
       (a) responsive to conduction of said first solid state switch means and to subsequent reception of a clockwise pulse to pass a trigger pulse to the control terminal of said solid state switch means to cause said second solid state switch means to conduct;
       (b) responsive to conduction of said second solid state switch means and to subsequent reception to the next clockwise pulse to pass a trigger pulse to the control terminal of said third solid state switch means to cause said third solid state switch means to conduct; and,
       (c) responsive to conduction of said third solid state switch means and to subsequent reception of an additional clockwise pulse to pass a trigger pulse to the control terminal of said first solid state switch means to cause said first solid state switch means to conduct; and in which said logic means includes:

(II) counterclockwise control means which is:
- (a) responsive to conduction of said first solid state switch means and to subsequent reception of a counterclockwise pulse to pass a trigger pulse to the control terminal of said third solid state switch means to cause said third solid state switch means to conduct;
- (b) responsive to conduction of said third solid state switch means and to subsequent reception of the next counterclockwise pulse to pass a trigger pulse to the control terminal of said second solid state switch means to cause said second solid state switch means to conduct; and,
- (c) responsive to conduction of said second solid state switch means and to reception of an additional counterclockwise pulse to pass a trigger pulse to the control terminal of said first solid state switch means to cause said first solid state switch means to conduct.

4. A control circuit according to claim 3, in which:
(I) said clockwise control means includes:
- (a) first, second, and third "and" circuits each having an output connected to the control terminals of said first, second, and third solid state switch means respectively, and two inputs, said output providing a pulse only when both inputs are simultaneously energized;
- (b) a source of said clockwise pulses connected to one input of each "and" circuit, the other input of each "and" circuit being connected to the output terminal of that solid state switch means immediately preceding the solid state switch means having its control terminal connected to the output of said "and" circuit; and, in which:

(II) said counterclockwise control means includes:
- (a) first, second, and third "and" circuits each having an output connected to the control terminals of said first, second, and third solid state switch means respectively and two inputs, said output providing a pulse only when both inputs are energized;
- (b) a sourc of said counterclockwise pulses connected to one input of each of said latter mentioned "and" circuits and the other input being connected to the output terminal of that solid state switch means immediately following the solid state switch means having its control terminal connected to the output of said "and" circuit.

5. A control circuit according to claim 1, including a reluctance motor having three field windings for generating magnetic vectors rotationally spaced successively by 120 degrees, said circuit terminals being connected respectively to said three field windings whereby successive energization of said field windings will provide a magnetic vector which is stepped through angles of 120 degrees in a clockwise direction in response to reception of clockwise pulses by said control circuit and stepped through angles of 120 degrees in a counterclockwise direction in response to reception of counterclockwise pulses by said control circuit.

References Cited in the file of this patent

UNITED STATES PATENTS

| | | |
|---|---|---|
| 2,706,270 | Steele | Apr. 12, 1955 |
| 2,790,124 | Eisele | Apr. 23, 1957 |
| 2,922,095 | Hesse | Jan. 19, 1960 |
| 2,953,735 | Schmidt | Sept. 20, 1960 |
| 3,042,847 | Welch | July 3, 1962 |